W. MYLES.
APPARATUS FOR DRAWING AUTOMOBILES OUT OF MUD HOLES.
APPLICATION FILED MAY 8, 1917.
1,293,875. Patented Feb. 11, 1919.
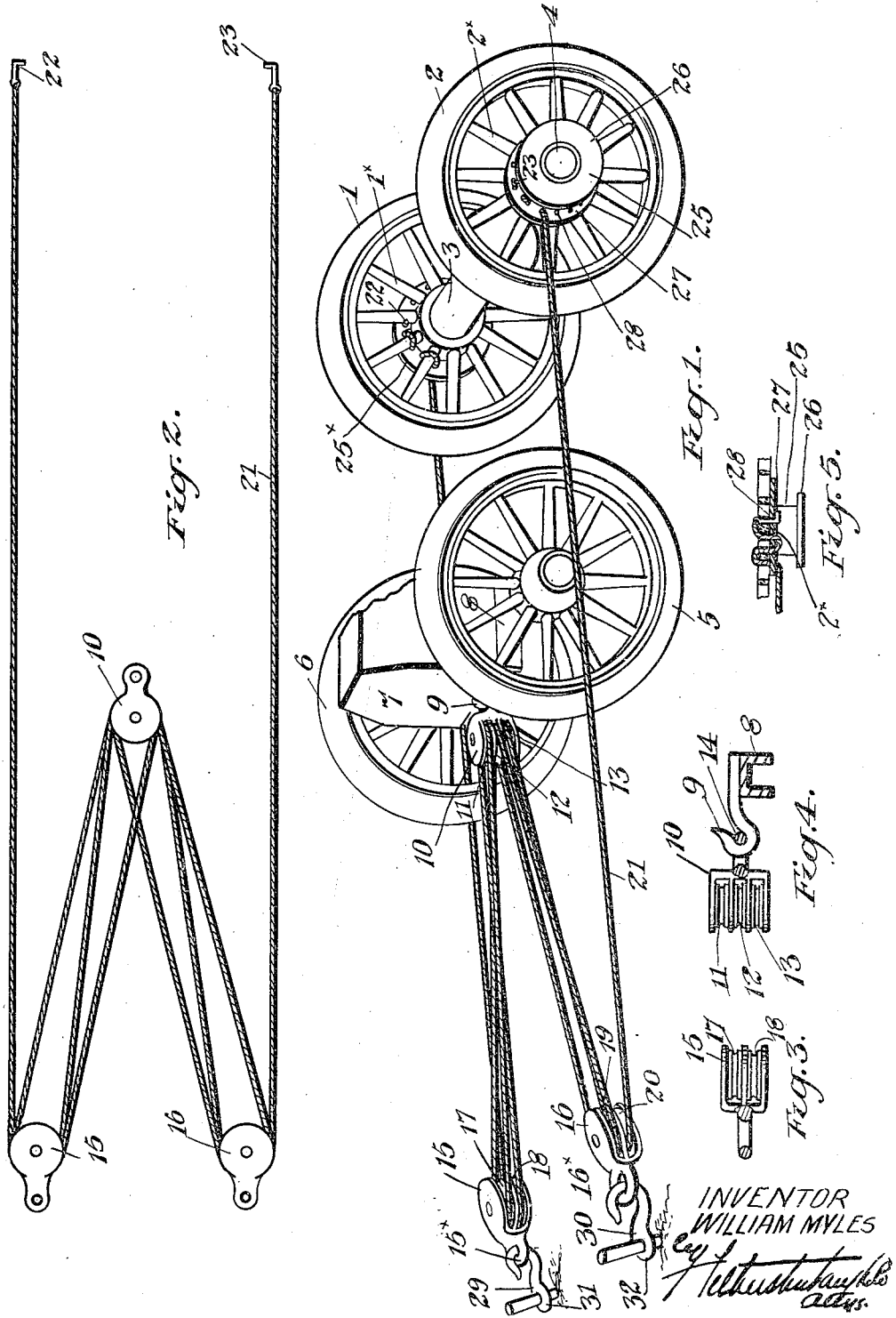
INVENTOR
WILLIAM MYLES

UNITED STATES PATENT OFFICE.

WILLIAM MYLES, OF BRADWARDINE, MANITOBA, CANADA.

APPARATUS FOR DRAWING AUTOMOBILES OUT OF MUD-HOLES.

1,293,875.  Specification of Letters Patent.  Patented Feb. 11, 1919.

Application filed May 8, 1917. Serial No. 167,228.

*To all whom it may concern:*

Be it known that I, WILLIAM MYLES, of the village of Bradwardine, in the county of Brandon, in the Province of Manitoba, Canada, have invented certain new and useful Improvements in Apparatus for Drawing Automobiles Out of Mud-Holes, of which the following is the specification.

My invention relates to improvements in apparatus for drawing an automobile out of a mud hole and the object of the invention is to devise a simple apparatus easily portable, which may be readily attached to the automobile and which will effectively operate to draw such automobile clear and it consists essentially of the following arrangement and construction of parts as hereinafter more particularly explained.

Figure 1, is a general perspective view showing the front and rear wheels of an automobile and the fore part of the radiator and my apparatus applied thereto.

Fig. 2, is a plan view of the tackle employed in my device.

Fig. 3, is an elevation partially in section of a two-pulley block adapted to be connected to a stationary support.

Fig. 4, is a side elevation partially in section of a three-pulley block and its connection to an automobile frame.

Fig. 5, is a plan view partially in section of the power drum and its connection to the drive wheels of the automobile.

In the drawings like letters of reference indicate corresponding parts in the various figures.

1 and 2 indicate the drive wheels of an automobile connected together by the axle 3, such wheels being provided with the hub 4. 5 and 6 indicate steering wheels and 7 a portion of the radiator which is supported on the frame 8 and from which extends a hook 9.

10 indicates a three-pulley block provided with pulleys 11, 12 and 13 and with an eye 14, which engages the hook 9. 15 and 16 indicate two pulley blocks, the pulley block 15 being provided with pulleys 17 and 18 and the pulley block 16 with pulleys 19 and 20.

21 indicates a cable, the free ends of which are provided with hooks 22 and 23. 25 and 25$^x$ indicate drums, which are forced into position around the hubs 4, each drum being provided with an outer and an inner flange 26 and 27 respectively, the inner flange being provided with a series of perforations 28, a pair of perforations 28 being located between each spoke 1$^x$ and 2$^x$ of each wheel 1 and 2. The hook 23 at one end of the cable 21 is passed through one of the perforations 28 and is then threaded around the spokes 2$^x$ through the intermediate perforations 28 as clearly shown in Fig. 5. The cable 21 then passes from the drum 25 around the pulleys 20 and from thence around the pulley 13 of the pulley block 10, then around the pulley 19 of the pulley block 16, then around the intermediate pulley 12 of the pulley block 10, then around the pulley 17 of the pulley block 15, then around the uppermost pulley 11 of the pulley block 10, then back around the pulley 18, from which it passes rearwardly to the drum 25$^x$ through the perforations 28 of which it is threaded so as to engage with the spokes 1$^x$ of the wheel 1.

The pulley blocks 15 and 16 are provided with eyes 15$^x$ and 16$^x$ which are connected by hooks 29 and 30 which are provided with eyes 31 and 32 through which stakes or other suitable means for securing the hooks in a stationary position are driven into the ground. Upon the tackle being connected to the automobile as above described the drive wheels of the automobile are thrown into clutch so as to wind the free ends of the cable 21 around the drums and thereby exert a pulling action upon the tackle to draw the automobile out of the mud.

From this description it will be seen that I have devised a very simple device which is readily attachable and which is easily portable, whereby an automobile may be quickly and easily drawn out of a mud hole when it has been stuck therein.

What I claim as my invention is—

1. In a device of the class described, a flanged drum adapted to be mounted on the hubs of automobile drive wheels, and having perforations in the flange thereof, and a cable having its free ends threaded through such perforations so as to pass around the intervening spokes of the drive wheels.

2. In a device of the class described, a flanged drum adapted to be mounted on the hubs of automobile drive wheels and having perforations in the flange thereof, a cable having its free ends threaded through such perforations so as to pass around the intervening spokes of the drive wheels, hooks attached to the free ends of the cable to engage in perforations in the flanges.

3. An attachment for spoked wheels comprising a drum, a member projecting from said drum adapted to be placed in proximity to the spokes and having perforations through which a cable may be passed to form loops for engagement with the spokes.

WILLIAM MYLES.

Witnesses:
F. E. BARBER,
K. J. SUFFKA.

Copies of this patent may be obtained for five cents each, by addressing the "Commissioner of Patents, Washington, D. C."